(No Model.)
E. P. FREDERICK.
WIRE ROPE FASTENING.
No. 341,101.  Patented May 4, 1886.
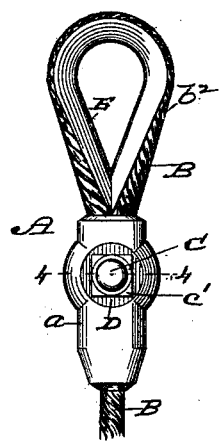
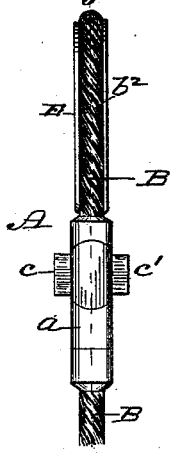
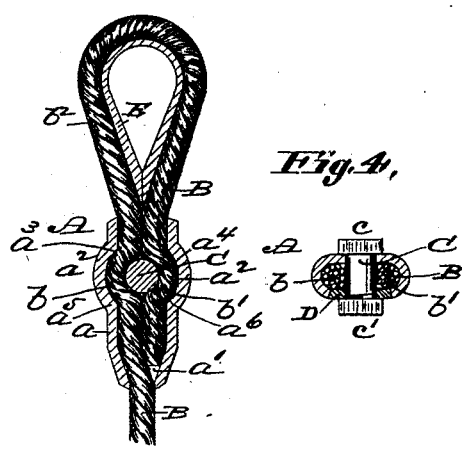
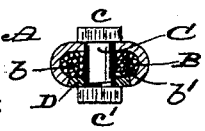
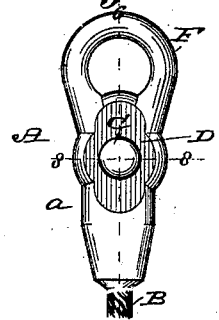
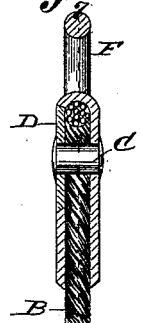
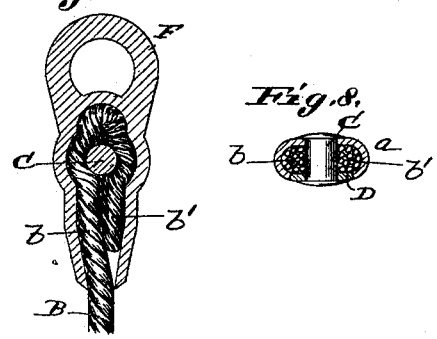
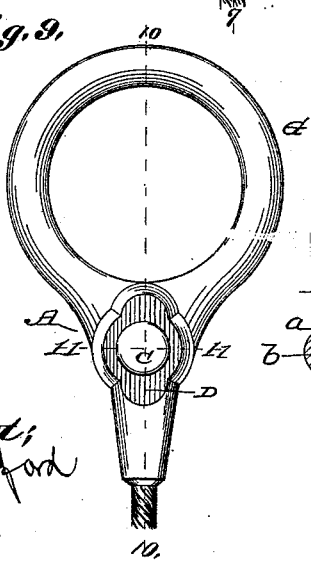
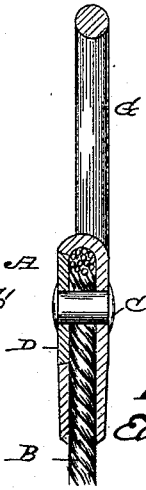
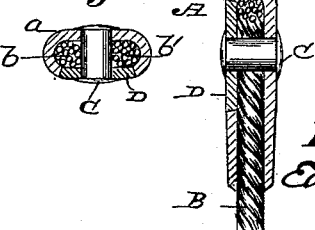
Attest:
Wcesanford
J. W. Hoke.
Inventor:
Edward P. Frederick
by C D Moody
atty

UNITED STATES PATENT OFFICE.

EDWARD P. FREDERICK, OF ST. LOUIS, MISSOURI, ASSIGNOR TO THE BRODERICK & BASCOM ROPE COMPANY, OF SAME PLACE.

WIRE-ROPE FASTENING.

SPECIFICATION forming part of Letters Patent No. 341,101, dated May 4, 1886.

Application filed December 7, 1885. Serial No. 185,026. (No model.)

*To all whom it may concern:*

Be it known that I, EDWARD P. FREDERICK, of St. Louis, Missouri, have made a new and useful Improvement in Wire-Rope Fastenings, of which the following is a full, clear, and exact description.

The improvement relates to the mode of connecting the rope with the fastening; and it consists in making the fastening so that the folded end of the rope may be placed and secured therein by wedging the parts of the fold apart within the fastening, substantially as is exhibited in the annexed drawings, making part of the specification, in which—

Figure 1 is a side elevation of the improvement. Fig. 2 is an edge elevation. Fig. 3 is a section on the line 3 3 of Fig. 2, and Fig. 4 is a section on the line 4 4 of Fig. 1. Fig. 5 is a side elevation exhibiting a modification of the fastening in that a closed socket or eye is used in the place of a thimble and the fold of the rope does not extend through the fastening. Fig. 6 is a section on the line 6 6 of Fig. 5. Fig. 7 is a section on the line 7 7 of Fig. 6, and Fig. 8 is a section on the line 8 8 of Fig. 5. Fig. 9 is a side elevation showing another modification of the fastening at its outer end. Fig. 10 is a section on the line 10 10 of Fig. 9, and Fig. 11 is a section on the line 11 11 of Fig. 9.

The same letters of reference denote the same parts.

A, Figs. 1, 2, 3, 4, represents a wire-rope fastening in which the improvement is incorporated.

B represents the rope.

The body $a$ of the fastening is perforated longitudinally, so as to permit of the folded end of the rope being passed through it, and the longitudinal perforation $a'$ is widened at $a^2$ $a^2$ to enable the parts $b$ $b'$ of the rope to be opened apart from each other, so as to be more or less out of line with the longitudinal perforation, or at least so that the fold $b'$ shall be out of line with the longitudinal perforation, and it is better to have both of the parts $b$ $b'$ out of line, as shown. The parts $b$ $b'$ are held apart and in their described positions by means of a suitable wedge, which causes the parts $b$ $b'$ to be held against the shoulders $a^3$ $a^4$ $a^5$ $a^6$, and thereby prevented from slipping in the fastening.

The wedge is preferably a bolt, C, whose head $c$ bears against one side of the fastening, and whose nut $c'$ bears against the opposite side of the fastening or against a plate or washer, D, which fits into the shell of the fastening, and so as to bear, when the nut is screwed onto the bolt, against the sides of the parts $b$ $b'$.

I prefer the last-described method, as thereby the parts $b$ $b'$ are both wedged apart by the bolt and clamped sidewise.

In the figures thus far described the rope is passed entirely through the fastening, and a thimble, E, is inserted in the bight $b^2$ of the rope; but in this respect the construction may be varied without departing from the principle of the improvement—that is, the rope need not be extended through the fastening, and in the place of the bight and thimble the fastening may be extended to form a closed socket or eye, F, Figs. 5, 6, 7, or with an open socket, or with a hook, or with a socket having a swivel-hook; or it may have an eye, G, arranged at one side of the plane of the fastening, as in Figs. 9, 10. In all these cases, however, the rope is secured from slipping in the fastening by means of a wedge passed through the fastening between the parts $b$ $b'$.

I claim—

1. The herein-described rope-fastening, consisting of the combination of an inclosing portion perforated longitudinally to receive the doubled rope, and a wedge portion or bolt for separating the two parts of the doubled rope, the inclosing portion being perforated laterally to admit the wedge, and the longitudinal perforation being widened in line with the wedge to receive the parts of the rope when forced out, substantially as set forth.

2. The combination of the inclosing portion $a$ and a clamping bolt or rivet, the part $a$ having a longitudinal perforation widened in line with the bolt, and having also the lateral plate D, which may be clamped against the rope by the bolt, substantially as set forth.

3. The combination, with the bight of a rope, of the thimble E inserted therein, the inclosing portion $a$, perforated longitudinally and containing the two parts of the rope contiguous to the thimble, and a wedge or bolt passing between said parts of the rope and confining them against the sides of the part *a*, substantially as set forth.

4. The combination of the inclosing portion *a*, having a longitudinal perforation oblong in cross-section of substantially twice the width in one direction as in the other, a wedge or bolt, C, adapted to be passed between the parts of the rope to confine them against the sides of the part *a*, and a lateral clamping-plate, D, substantially as set forth.

EDWARD P. FREDERICK.

Witnesses:
C. D. MOODY,
D. W. C. SANFORD.